United States Patent
Nendell et al.

(10) Patent No.: US 6,343,361 B1
(45) Date of Patent: Jan. 29, 2002

(54) DYNAMIC CHALLENGE-RESPONSE AUTHENTICATION AND VERIFICATION OF IDENTITY OF PARTY SENDING OR RECEIVING ELECTRONIC COMMUNICATION

(75) Inventors: Donald F. Nendell; David L. Hunter, Sr., both of West Jordan; Eric D. Wade, Ogden, all of UT (US)

(73) Assignee: Tsunami Security, Inc., West Valley City, UT (US)

( * ) Notice: Subject to any disclaimer, the term of this patent is extended or adjusted under 35 U.S.C. 154(b) by 0 days.

(21) Appl. No.: 09/192,008

(22) Filed: Nov. 13, 1998

(51) Int. Cl.[7] .................................................. G06F 1/24
(52) U.S. Cl. ....................... 713/171; 713/200; 713/201; 380/277; 380/278
(58) Field of Search .................................. 713/171, 200, 713/201; 380/277, 278, 283, 281

(56) References Cited

U.S. PATENT DOCUMENTS

| | | | |
|---|---|---|---|
| 3,665,162 A | 5/1972 | Yamamoto et al. | 235/61.7 B |
| 4,227,253 A * | 10/1980 | Ehrsam et al. | 380/45 |
| 4,679,236 A | 7/1987 | Davies | 380/23 |
| 5,144,667 A | 9/1992 | Pogue, Jr. et al. | 380/45 |
| 5,225,664 A | 7/1993 | Iijima | 235/380 |
| 5,485,510 A | 1/1996 | Colbert | 379/145 |
| 5,510,777 A | 4/1996 | Pilc et al. | 340/825.31 |
| 5,590,038 A | 12/1996 | Pitroda | 395/241 |
| 5,655,020 A | 8/1997 | Powers | 380/25 |
| 5,661,803 A * | 8/1997 | Cordery et al. | 380/21 |
| 5,661,807 A | 8/1997 | Guski et al. | 380/25 |
| 5,680,456 A * | 10/1997 | Baker et al. | 380/21 |
| 5,706,427 A | 1/1998 | Tabuki | 395/187.01 |
| 5,719,914 A | 2/1998 | Rand et al. | 378/4 |
| 5,740,361 A | 4/1998 | Brown | 395/187.01 |
| 5,761,309 A | 6/1998 | Ohashi et al. | 380/25 |
| 5,778,173 A | 7/1998 | Apte | 395/187.01 |
| 5,790,667 A | 8/1998 | Omori et al. | 380/23 |
| 5,799,085 A | 8/1998 | Shona | 380/23 |

* cited by examiner

*Primary Examiner*—Thomas R. Peeso
(74) *Attorney, Agent, or Firm*—Workman, Nydegger & Seeley (57) ABSTRACT

Methods and systems for verifying and authenticating the identity of participants in electronic communication. The identity of a recipient communication device, such as a computer, can be verified. A primary key generated from a master key is stored at a sending device and the recipient device. Based on the primary key, the sending device generates a passphrase and an associated secondary key, which includes an encrypted form of the recreation process the passphrase. The secondary key is transmitted to the recipient device, which can reconstruct the passphrase by decrypting the secondary key using the primary key. By reconstructing the passphrase, the secondary key verifies that it has used the correct primary key. The identity of a user of a communication device can be verified and authenticated, as well. The user is issued an authorization key, a copy of which is stored at a remote communication device with respect to the user. Using the authorization code, the user selects specified character positions of the passphrase and enters the resulting input code to the local communication device. The input code is transmitted to the remote communication device. Entering the appropriate input code verifies that the user possesses the authorization code.

21 Claims, 9 Drawing Sheets

DYNAMIC CHALLENGE-RESPONSE AUTHENTICATION AND VERIFICATION OF IDENTITY OF PARTY SENDING OR RECEIVING ELECTRONIC COMMUNICATION

BACKGROUND OF THE INVENTION

1. The Field of the Invention

The present invention relates to securely transmitting information over communication networks. In particular, the present invention relates to systems and methods for verifying the identity of a sender and/or a recipient of information transmitted over a communication network.

2. Relevant Technology

During recent years, there has been tremendous growth in the amount and types of information that are transmitted between remote locations using telecommunication networks. For example, the Internet has become widely used in electronic commerce, education, banking, investing, and many other areas. The Internet and other wide area and local area networks have greatly enhanced the ability to transmit large volumes of information between people. While many segments of the economy have been transformed by the ongoing communication revolution, the finance industry has been particularly affected. For instance, financial transactions have become increasingly cashless as debit cards, credit cards, smart cards and other techniques for authorizing electronic transfer of funds have become widely used.

There are several reasons for the increased use of electronic systems and telecommunication systems for transmitting information and conducting business. First, data processing speeds have vastly increased during recent decades to permit large volumes of information to be processed in relatively short periods of time. Likewise, the size, cost, and speed of mass data storage systems have improved, thereby allowing large volumes of information to be conveniently stored and accessed. In addition, the data transmission rates of telecommunication systems have grown equally as fast, which permits large amounts of data to be rapidly transmitted between distant locations.

There have been some limiting factors that have prevented electronic communication of information from being fully utilized in many situations. A persistent problem involves the difficulty of verifying the identity of participants in electronic communication. For instance, it is often difficult to determine whether a person receiving a document via email is, in fact, the intended recipient. Likewise, it has often proved impossible to conclusively determine whether a person using a credit card number to execute an electronic transaction is an authorized user of the credit card. In yet another example, it has often been difficult to be certain of the identity of a person creating an electronic document. Thus, in situations where electronically created or transmitted information is particularly sensitive, in, for example, the banking and legal industries, electronic communication has not been practical or fully accepted. Instead, hand-signed hard copies of documents, conventional hand delivery of documents, and face-to-face transactions are still widely used, although their electronic counterparts would often be more efficient were it not for the persistent security limitations.

In order to attempt to overcome the aforementioned problems of identifying participants in electronic communication, a variety of approaches have been taken. Often, information is encrypted before it is transmitted over open communication networks such as the Internet, stored on computer-readable media, or otherwise placed in a position where it could be potentially intercepted by unauthorized users. Transmitted encrypted information can be decrypted if the recipient possesses the appropriate decryption key. Otherwise, unauthorized recipients are unable to view or otherwise use the contents of the encrypted information.

One commonly used encryption technique is private/public key cryptography, such as RSA, in which each user has a public key published for anyone to see and an associated private key. A sender looks up the recipient's public key and uses it to encrypt the data to be transmitted. The recipient uses the secret, private key to decrypt the information. While the private/public key approach provides reasonably secure transmission in may circumstances, it has several drawbacks. The use and maintenance of the private and public keys can be quite expensive for organizations. Moreover, if the security of the private key is breached, new private and public keys must be created, with the new public key being published to all interested users, and the old public key being invalidated, wherever it might exist.

Another approach to maintaining the security of electronic information involves using passwords to identify users of computer networks, recipients of information, etc. For instance, information transmitted over a communication network to a recipient may be password protected, in that it may not be decrypted, decompressed, or otherwise placed in a usable form unless the recipient possesses a specified password. In other situations, passwords are required to gain access to computer networks in the first instance. Typically, when a user logs onto a computer network, the user is prompted to enter a password that enables the user to gain access to resources of the computer network.

The basic concept underlying passwords is that any person possessing the password is assumed to be authorized to access particular information or perform selected operations. In practice, however, it has been found that passwords are often the weak link in an electronic security system. Sometimes, network users select passwords such as birthdays or names of family members that could be easily guessed by unauthorized persons. In other situations, users write their password in plain sight, such as on a note affixed to a computer monitor. Such practices essentially negate the security advantages of passwords. Furthermore, particularly persistent persons could intercept a user's password by memorizing a series of a few keystrokes while observing the user entering a password into a computer. Thus, many businesses require employees to regularly change their passwords in an attempt to strengthen network security systems. In any event, it has been found that unauthorized persons often successfully obtain users' passwords, thereby compromising any security measures associated with the passwords.

A related security technique is the use of personal identification numbers (PINs) in electronic commerce and other situations. A PIN is a number assigned to or selected by a cardholder, for example, in order to verify the identify of a person attempting to execute a transaction. PINs are widely used in automatic teller machines, credit and debit card readers, electronic commerce websites, and other situations where electronic funds transfer is to be initiated. Likewise, access numbers, which are analogous to PINs, are widely used in businesses, the military, and other organizations having sensitive buildings or areas. Persons wishing to gain access to sensitive buildings or areas must enter an access number to an access control device that permits entry only to authorized persons. Like passwords, PINs and access codes are subject to being stolen or otherwise obtained by unauthorized individuals. Because PINs are generally static or, in other words, remain usable in multiple transactions, they are sometimes stolen by an unauthorized person watching a PIN being entered into a keypad.

In view of the foregoing, electronic communication and creation of information has been limited in many situations by the failure of conventional security measures to reliably permit the identity of participants to be verified. Thus, it would be an advancement in the art to provide systems and methods for both verifying and authenticating the identity of participants in electronic communication that do not merely rely on password protection, PINs, or public key/private key encryption.

SUMMARY AND OBJECTS OF THE INVENTION

The present invention relates to systems and methods for verifying and authenticating the identity of participants in electronic communication. The invention replaces or supplements the reliance that conventional systems place on passwords to verify the identity of participants in electronic communication. In addition, the invention replaces or supplements the reliance that conventional systems place on PINs and access codes to identify users of communication devices or the authorization of such persons to access resources.

In one implementation, a primary key is stored at a sending device and at a recipient device. The primary key and the other keys and passphrases can include a string of characters. The sending device generates a passphrase and an associated secondary key. The secondary key represents an encrypted form of the reconstruction capability the passphrase that has been encrypted based on the contents of the primary key. The secondary key is transmitted from the sending device to the recipient device when electronic communication is to be performed. The recipient device decrypts the secondary key using the primary key to reconstruct the passphrase. Reconstructing the passphrase can only be performed by recipient devices that possess the primary key. Accordingly, reconstruction of the passphrase demonstrates that the recipient device has received the secondary key and possesses the correct primary key. The passphrase can then be transmitted in return to the sending device or can be used locally at the recipient device to access documents that have been passphrase-protected or to access resources that are conventionally accessible by using passwords.

The invention replaces conventional passwords in the foregoing manner. The passphrases differ from conventional passwords in that the passphrases are dynamic. A new passphrase and associated secondary key can be generated each time electronic communication is conducted. Accordingly, passphrases are not memorized by users, nor are they stored permanently in the memory of recipient devices. As such, passphrases are not subject to misappropriation by unauthorized persons who might otherwise memorize keystrokes associated with passwords or discover a written copy of a password.

Verification of the identity of a human user of a communication device is accomplished by combining the passphrases of the invention with an authorization code memorized by the user. The authorization code represents an ordered series of character positions of the passphrase. When prompted, the user selects the characters of a displayed passphrase that reside at the character positions specified by the authorization code. The user then uses the selected characters to generate and transmit an input code to a remote communication device. The secondary key with its associated passphrase and the authorization code are stored at the remote communication device, thereby permitting the remote device to determine the expected input code. Users who do not possess the authorization code are unable to generate the expected input code. Thus, when the remote device receives an input code that matches the expected input code, it concludes that the user has been verified and is authorized to gain access to information or other resources.

The input codes and associated authorization codes can be used in situations that otherwise require the use of PINs or access codes. In this manner, the input codes replace conventional PINs. The specific content of any particular input code depends on the passphrase from which it is derived. Since passphrases typically change with each transaction, the input codes used in successive transactions are different one from another. In contrast, PINs are static, with the same PIN being used in multiple transactions. Thus, input codes are not subject to many of the security risks involved with static PINs, such as interception by unauthorized persons observing a PIN being entered by a user.

The primary key, on which the secondary keys and passphrases are based, can be conveniently replaced as desired. For instance, if a client computer having stored thereon a copy of the primary key is stolen, the security of the particular primary key may be compromised. However, a new primary key can easily be generated in response to the possible breach of primary key security. Once the new primary key is generated and stored at the sending and recipient devices, the invention can be practiced as if the security of the key had never been breached. In contrast, conventional public/private key cryptology is not capable of responding in a cost-effective manner to the security of a private key being compromised. If a conventional PKI private key is published, the owner of the private key can be subjected to the significant expense of obtaining a new public/private key combination and making the new public key available to interested users, plus invalidating the old public key wherever it resides.

Subsequent communication between the sending device and the recipient device can include a document that is passphrase-protected as well as encrypted with a symmetrical encryption algorithm using the same generated passphrase. In other words, the recipient of the passphrase-protected document must obtain the passphrase to access the document.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention relates to systems and methods for verifying and authenticating the identity of participants in electronic communication. Participants can include computers, telecommunications devices, or the human users of computers or telecommunication devices. In one embodiment, communication between a sending communication device and a recipient communication device can be regulated using the invention. A primary key is stored at both the sending device and at the recipient device. The sending device generates a passphrase recreating process and an associated secondary key. The secondary key represents an encrypted form of the passphrase recreating process that has been encrypted based on the contents of the primary key. Subsequent communication between the sending device and the recipient device can include a document that is passphrase-protected and/or symmetrically encrypted using the generated passphrase. In other words, the recipient of the passphrase-protected document must obtain the passphrase to access the document.

The passphrase-protected document is transmitted from the sending device to the recipient device along with a copy of the secondary key. The recipient device, which possesses the primary key, uses the primary key to decrypt the secondary key, thereby reconstructing the passphrase. The reconstructed passphrase can then be used to access the document. Other recipients, such as unauthorized persons who might intercept the passphrase-protected document, do not possess the primary key and cannot reconstruct the passphrase. In subsequent communication between the sending and recipient devices, new passphrases and associated secondary keys can be generated. Accordingly, the passphrases of the invention can be dynamic in the sense that they can change with each transaction, unlike conventional passwords, which are used repeatedly.

In one embodiment, the invention includes features for further identifying a user operating either the sending device or the recipient device. Each user is assigned or chooses an authorization code, which includes an ordered series of character positions of the passphrases to be used in the electronic communication. A copy of the authorization code is stored at the communication device (i.e., the sending or recipient device) that is remote with respect to the user. When communication is to be conducted, the user is shown a copy of the passphrase and instructed to select the characters thereof that reside at the character positions specified in the authorization code. The identity of the characters selected using the authorization code is transmitted to the remote communication device, which can then verify whether the user possesses the correct authorization code. Unlike conventional PINs, which are static, the authorization codes of the invention result in a completely different set of characters being selected in every transaction, based on the changeable nature of the passphrases of the invention.

As used herein, the terms "sending device" and "recipient device" are used to describe communication devices that transmit electronic information. Of course, in many situations, electronic communication is two-way. Thus, a specific communication device can alternatingly be seen as a sending device and a recipient device. While some of the specific embodiments of the invention are disclosed in the context of identifying a recipient device or the user of a sending device, the invention is equally applicable to identifying either or both of the sending device and the recipient device, and any users thereof Embodiments of the invention include or are incorporated in computer-readable media having computer-executable instructions or data structures stored thereon. Examples of computer-readable media include RAM, ROM, EEPROM, CD-ROM or other optical disk storage, magnetic disk storage or other magnetic storage devices, or any other medium capable of storing instructions or data structures and capable of being accessed by a general purpose or special purpose computer. Computer-readable media also encompasses combinations of the foregoing structures. Computer-executable instructions comprise, for example, instructions and data that cause a general purpose computer, special purpose computer, or special purpose processing device to execute a certain function or group of functions. The computer-executable instructions and associated data structures represent an example of program code means for executing the steps of the invention disclosed herein.

The invention further extends to computer systems and telecommunication systems for verifying the identity of participants in electronic communication. Those skilled in the art will understand that the invention may be practiced in computing environments with many types of computer system configurations, including personal computers, multi-processor systems, network PCs, minicomputers, mainframe computers, and the like. The invention will be described herein in reference to a distributed computing environment, such as the Internet, where tasks are performed by remote processing devices that are linked through a communication network. In the distributed computing environment, computer-executable instructions and program modules for performing the features of the invention may be located in both local and remote memory storage devices.

Figure 1:
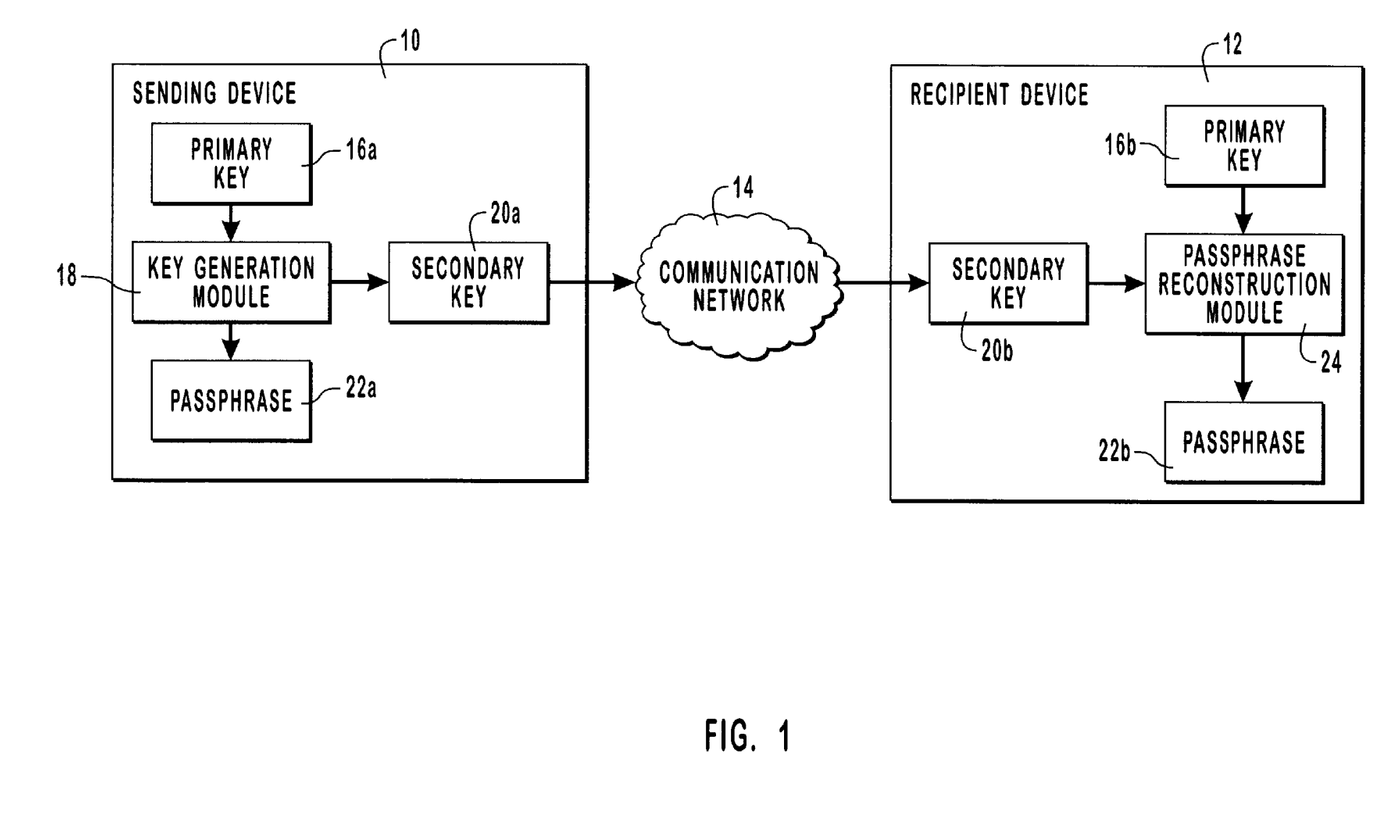
FIG. 1 is a schematic diagram illustrating the use of primary keys, secondary keys, and passphrases to securely communicate between a sending device and a recipient device according to the invention.

FIG. 1 illustrates an example of the architecture of communication network in which the identity of a recipient device will be verified. As used herein, sending devices and recipient devices are to be broadly construed to extend to any general purpose computer, special purpose computer, processing device, telecommunication device, and the like that is used to transmit or receive information.

In FIG. 1, sending device 10 is linked to recipient device 12 by means of communication network 14. Communication network 14 may be any wide area or local area network by which special-purpose or general-purpose computers communicate one with another. In addition, communication network 14 may be a public telephone network or any other system that permits communication between telecommunication devices. Those skilled in the art will recognize that the invention described herein has wide applicability to a variety of implementations and is not to be limited to the specific embodiments disclosed herein.

One part of the techniques for enabling verification of the identity of the participant in electronic communication involves a storing a copy 16A of a primary key at sending device 10 and a copy 16B Of the primary key at recipient device 12. In one embodiment, primary keys, the secondary keys, the passphrases, and the master keys disclosed herein include a string of characters. The characters of the primary keys, secondary keys, passphrases, and master keys can be alphanumeric, ASCII, alphabetic, numeric, or any other desired characters or combination of the foregoing.

In the embodiment of FIG. 1, sending device 10 includes a key generation module 18. Key generation module 18 includes processing means for generating a secondary key 20A and a passphrase 22A based at least in part on the contents of primary key 16A. For instance, key generation module 18 can include algorithms for selecting a passphrase 22A that is derived from primary key 16A. The passphrase generated by key generation module 18 will be different each time sending device 10 is used. In the embodiment of FIG. 1, passphrase 22A can be a string of seven characters that can be used later to enable a user of recipient device 12 to access information transmitted over communication network 14, or to otherwise verify the identity sending device 10, recipient device 12, or users of the devices. In other embodiments, the length of the string of characters that constitute the passphrases of the invention can be shorter or longer.

As shown in FIG. 1, key generation module 18 generates passphrase 22A. Key generation module 18 also generates secondary key 20A, which in this embodiment, includes an encrypted form of the string of characters that constitute passphrase 22A. In other words, secondary key 20A includes the information needed to enable one who possesses primary key 16 to decrypt or otherwise reconstruct passphrase 22. Therefore, a recipient of secondary key 20 who possesses primary key 16 and the appropriate decryption algorithm can reconstruct passphrase 22. Accordingly, key generation module 18 can include algorithms for encrypting the string of characters that constitute passphrase 22 to generate secondary key 20. Those skilled in the art will understand, when learning of the disclosure made herein, how to construct the primary keys, the secondary keys and the passphrases of the invention and how to create the algorithms included in the key generation module.

Figure 2A:
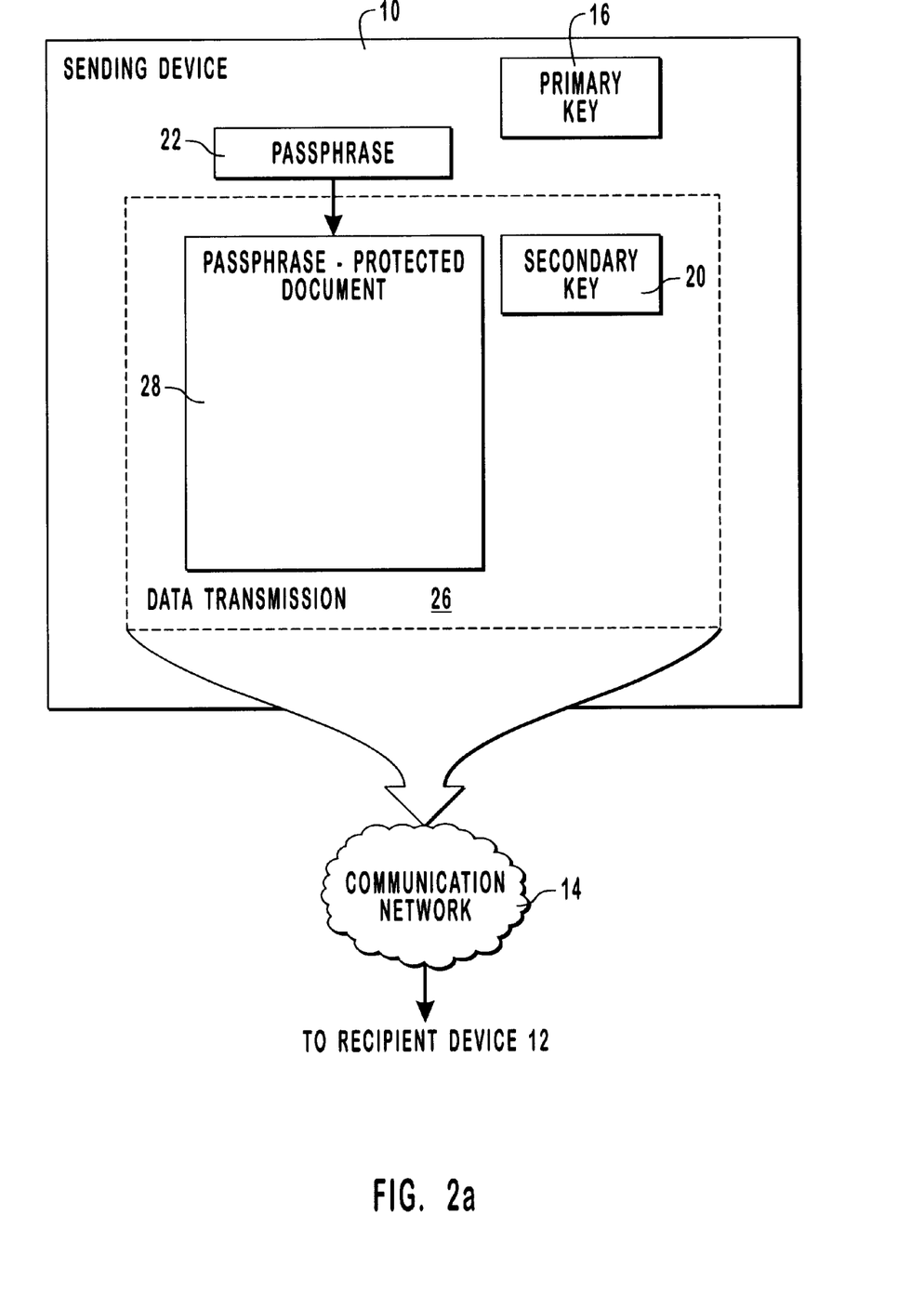
FIG. 2a is a schematic diagram depicting a passphrase-protected document being sent from a sending device.

As shown in FIG. 1, secondary key 20A is transmitted over communication network 14 to recipient device 12. Thus, as shown in FIG. 1, recipient device 12 obtains a copy 20B of secondary key. Recipient device 12 includes a passphrase reconstruction module 24 that uses secondary key 20B and primary key 16B to reconstruct passphrase 22. Thus, recipient device 12 is capable of reconstructing a copy 22B of the passphrase when it receives secondary key 20B over communication network 14. Since secondary key 20B includes an encrypted form of the recreation process of passphrase 22, passphrase reconstruction module 24 can include the appropriate decryption algorithm to decrypt the passphrase based on the contents of primary key 16B. Thus, those skilled in the art will understand how to reconstruct passphrase 22B using passphrase reconstruction module 24A upon learning of the disclosure made herein.

p The above-described process of reconstructing passphrase 22B at recipient device 12 has the effect of verifying that the recipient device possesses primary key 16B. Without a copy 16B of the primary key, recipient device 12 is unable to use passphrase reconstruction module 24 to reconstruct the appropriate passphrase 22B. Unauthorized recipients of secondary key 20B cannot generate passphrase 22B. Reconstructing passphrase 22B at recipient device 12 can have many applications. In the example illustrated in FIGS. 2A and 2B, the passphrase is used as a substitute for a password in the transmission of secure documents. As shown in FIG. 2A, sending device 10 can be used to construct information to be included in a data transmission 26. For instance, sending device 10 can be a personal computer capable of transmitting an e-mail and an attached text document over the Internet.

In this example, data transmission 26 includes a passphrase-protected document 28 and secondary key 20. Passphrase-protected document 28 is any desired data structure that is to be transmitted from sending device 10 to recipient device 12. Passphrase-protected document 28 can be compressed and/or encrypted using any desired compression or encryption software or techniques. By way of example, and not limitation, document 28 can be compressed using Pkzip produced by PKWARE, Inc. or WinZip produced by WinZip, et al. Document 28 is thus encoded in manner such that it will not be accessible by recipient device 12 unless the recipient device obtains the appropriate passphrase 22. Document 28 can be passphrase-protected by processing the document using conventional password protection software. For instance, password protection can be performed by the software that encrypts or compresses document 28. From the standpoint of the password protection software, passphrase 22 is treated as a conventional password to protect document 28 from unauthorized use. Secondary key 20 and passphrase 22 of FIG. 2A can be generated from primary key 16 as described previously in reference to FIG. 1.

As used herein, the term "passphrase" is defined to include any string of characters that enable access to electronic information or to computer networks or telecommunication networks. Thus, passphrases are similar to conventional passwords to the extent that they can enable access to information or to networks. However, unlike conventional passwords, the passphrases of the invention need not be memorized by a user at recipient device 12 or permanently stored at recipient device. Instead, the passphrases according to this embodiment are generated using the primary key at the sending device and are reconstructed at the recipient device as has been described in reference to FIG. 1. The passphrases of the invention further depart from conventional passwords in that a new passphrase can be generated each time data is transmitted from a sending device to a recipient device. In contrast, conventional passwords are static, with the same password being repeatedly used by a user of a recipient device until the user or a network administrator establishes a new password.

Figure 2B:
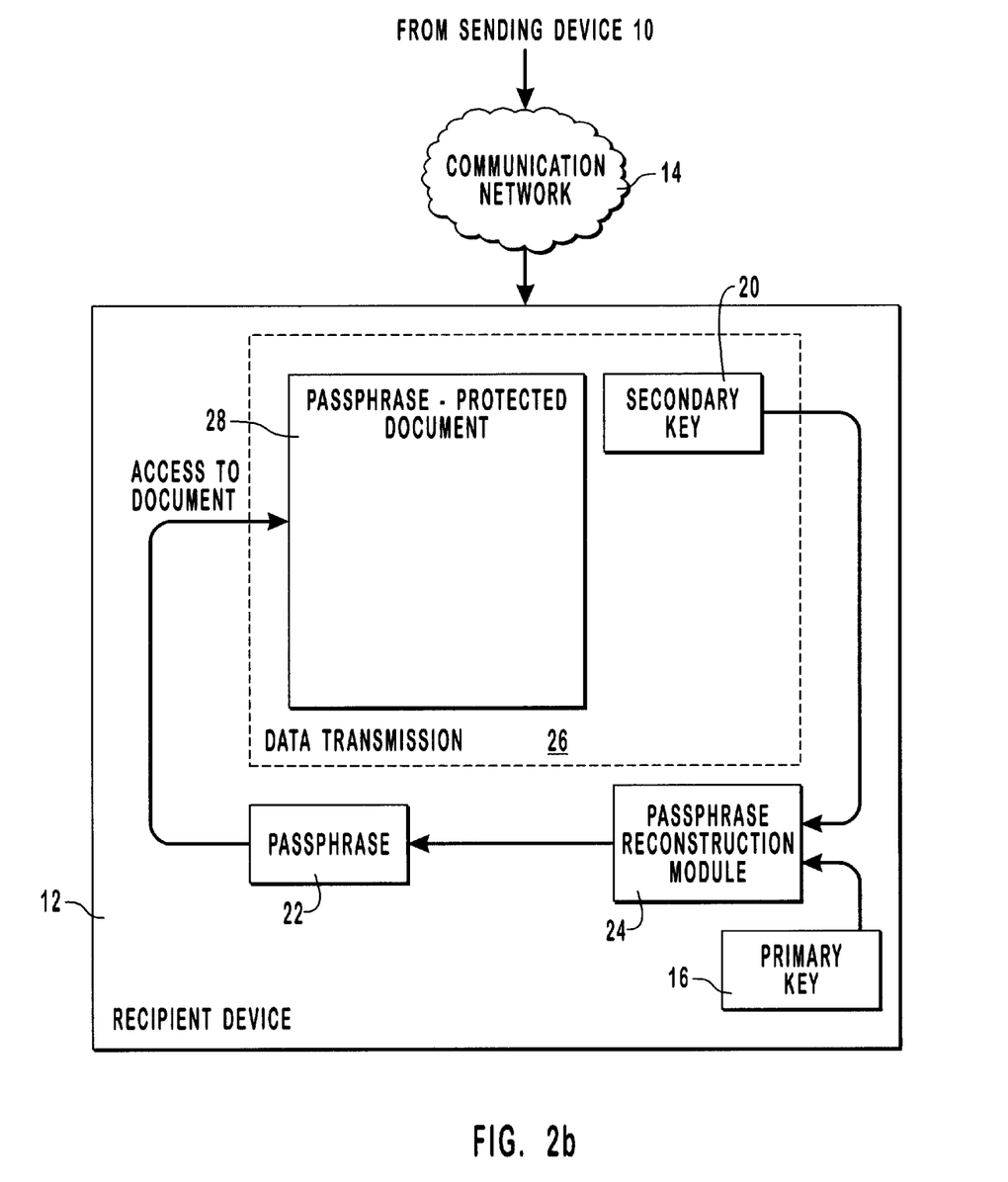
FIG. 2b is a schematic diagram illustrating the passphrase-protected document of FIG. 2a being received by a recipient device.

As shown in FIGS. 2A and 2B, data transmission 26, including secondary key 20 and passphrase-protected document 28, is transmitted from sending device 10 to recipient device 12 via communication network 14. Upon receiving data transmission 26, a user of recipient device is unable to access passphrase-protected document 28, which is protected by passphrase 22, until it retrieves secondary key 20 and performs the operations described in FIG. 2B. In contrast, however, the user of recipient device 12 is able to freely access secondary key 20. For instance, secondary key 20 may be attached to data transmission 26 as a comment, as a file, or in any other manner that does not require use of a password or a passphrase. Recipient device 12 then inputs secondary key 20 and primary key 16 to passphrase reconstruction module 24 to reconstruct passphrase 22. Reconstruction of passphrase 22 can be accomplished according to the techniques described above in reference to FIG. 1. The reconstructed passphrase 22 is then used to access passphrase-protected document 28 as shown in FIG. 2B. For instance, if the passphrase-protected document is compressed by Pkzip or WinZip software, the passphrase is inputted to the software as a substitute to a conventional password.

In the example of FIG. 2A and 2B, the use of secondary key 20 and primary key 16 to reconstruct passphrase 22 can be accomplished only by recipient devices 12 that have a copy of primary key 16 stored thereon. Unauthorized recipients of password-protected document 28 are unable to reconstruct password 28.

One advantage of the invention is understood by contrasting the example of FIGS. 2A and 2B with conventional password-protected communication. In the absence of the invention, document 28 could be protected by a password. However, password protection of document 28 would require the user of recipient device 12 to enter a conventional password or a prior agreed upon password or to telephone the recipient to divulge the password, or would require the conventional password to be permanently stored at recipient device 12. The use of conventional passwords is inherently insecure, since passwords are often stolen or divulged to unauthorized persons. In contrast, there is no password to be memorized or learned by the recipient according to the example of FIGS. 2A and 2B. A different passphrase can be generated at sending device 10 each time a data transmission 26 is made. Thus, the passphrase techniques of the invention are dynamic, whereas conventional passwords are static, in that they are repeatedly used by a user of the recipient device.

Figure 3:
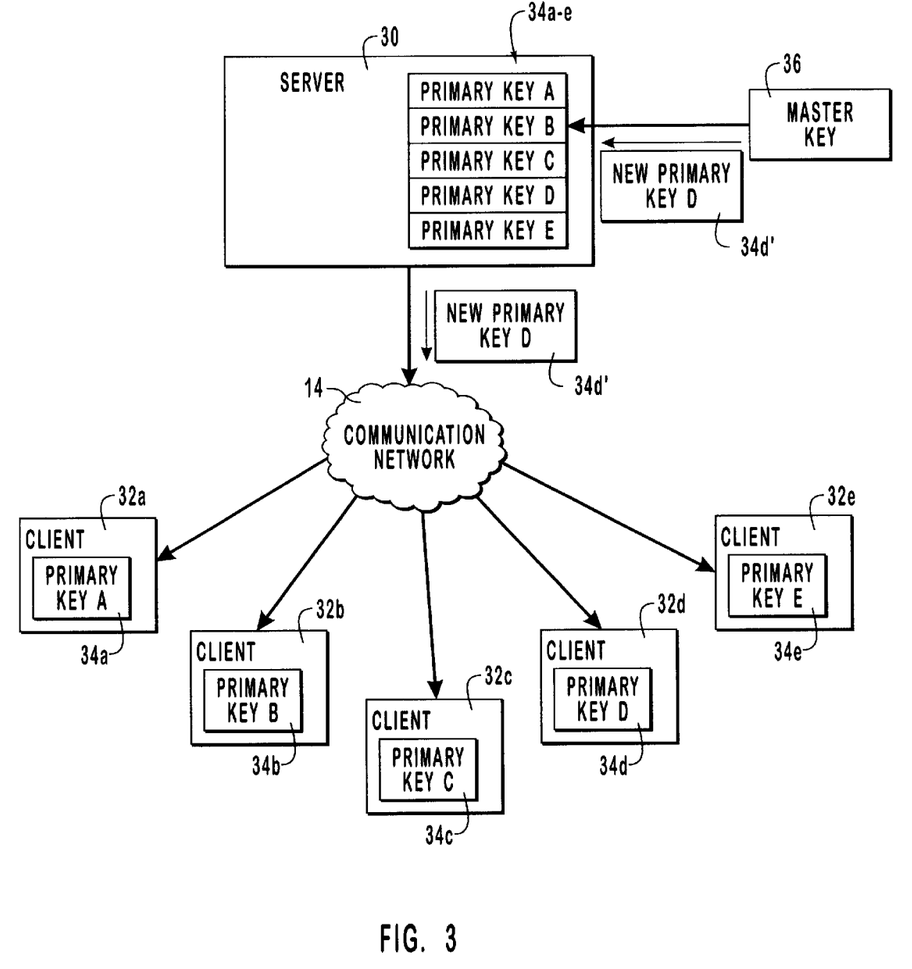
FIG. 3 is a schematic diagram illustrating a series of primary keys distributed among a server and multiple clients in a network environment in order to permit selective communication between the server and individual clients.

The present invention can be adapted to respond to the theft of recipient device 12 or the publication of primary key 16 stored thereon. As shown in FIG. 3, the primary keys from which the passphrases and secondary keys of the invention are generated can be replaced at will. Thus, if the security of any single primary key is somehow breached, the compromised primary key can be conveniently replaced without undue expense or effort. In FIG. 3, a server computer 30 is linked with a plurality of client computers 32A–32E by means of communication network 14. Server 30 has stored thereon copies of a plurality of primary keys 34A–34E that correspond with copies of primary keys A–E (34A–34E) stored individually on client computers 32A–32E. In this embodiment, the primary keys are generated using a master key 36 that is stored at a secure location at server 30 or separately therefrom. To illustrate, if the security of primary key 34D is breached, primary key 34D can be easily replaced. For example, master key 36 can generate a new primary key 34D', which is transmitted and stored at server 30 and in turn at client 32D.

FIG. 3 also illustrates another optional feature of the invention, whereby individuals or subsets of a plurality of clients or other recipient devices are assigned different primary keys. Accordingly, if a data transmission similar to data transmission 26 of FIGS. 2A and 2B is sent, for example, from server 30 to client 32A of FIG. 3, the data transmission would be protected by a passphrase generated from primary key 34A. Clients 34B–34E, which do not possess primary key 34A, would be unable to generate the appropriate passphrase and cannot gain access to the data transmission. In this manner, the invention provides the flexibility to specify the access credentials of various recipient devices by disclosing particular primary keys thereto. Moreover, the invention is flexible enough to permit the convenient replacement of any primary key whose security is breached.

Figure 4A:
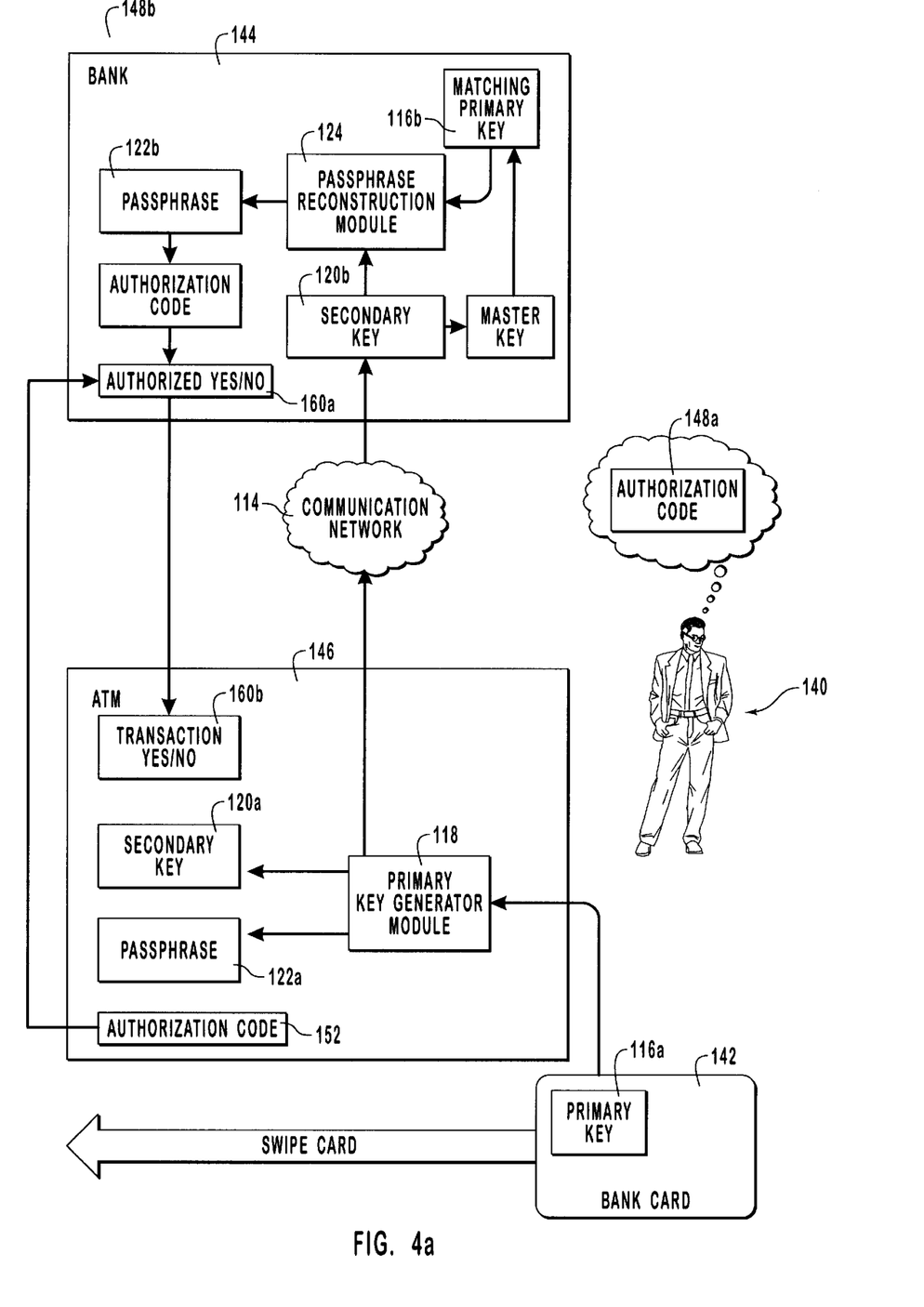
FIG. 4a is a schematic diagram showing the methods of the invention for verifying and authenticating the identity of a participant in electronic communication as applied to a financial transaction.
Figure 4B:
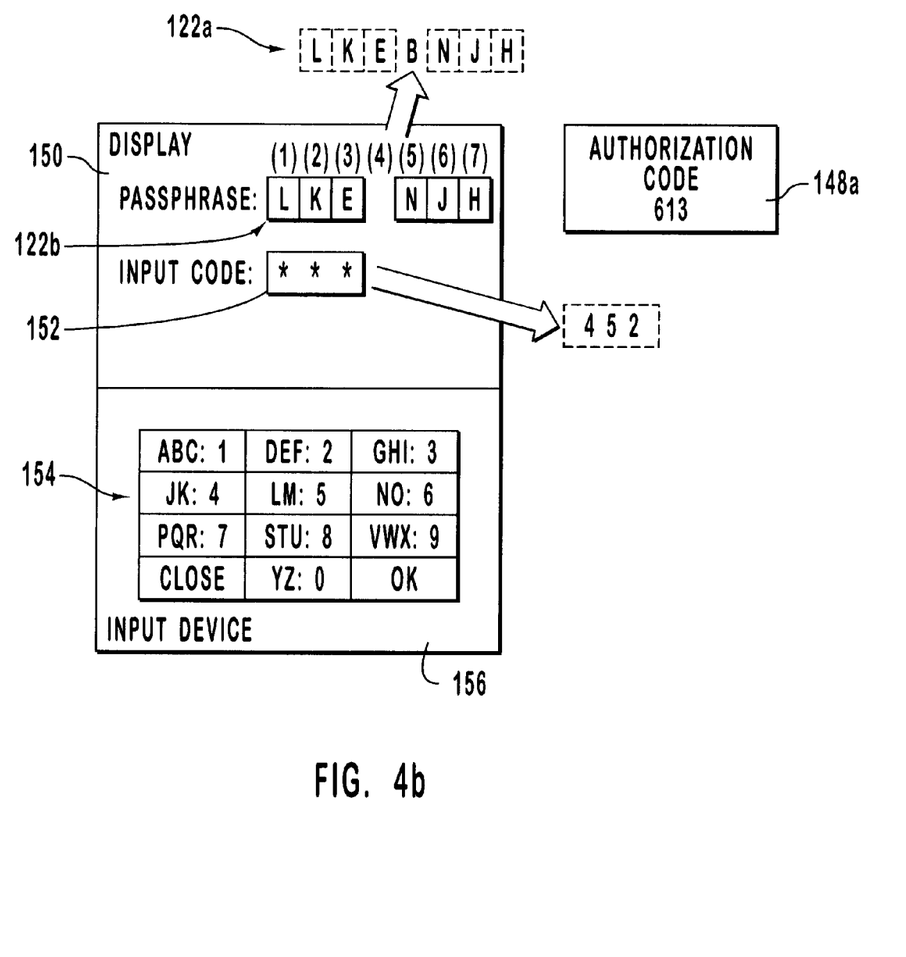
FIG. 4b is a schematic diagram depicting one example of the use of an authorization code and a passphrase to verify and authenticate the identity of a participant in electronic communication.
Figure 4C:
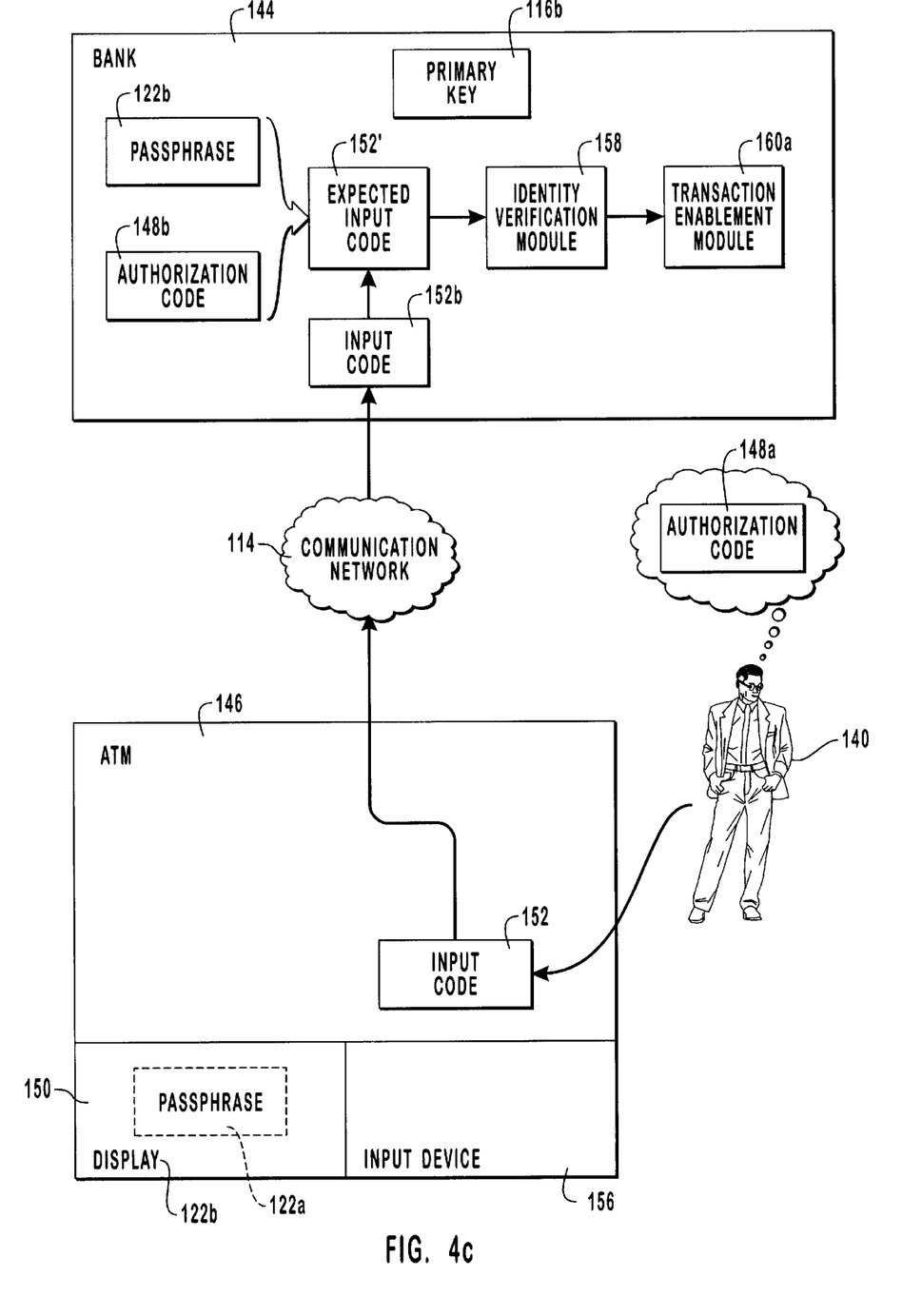
FIG. 4c is a schematic diagram further illustrating the enablement of a financial transaction based on the use of an authorization code and a passphrase.

FIGS. 4A–4C illustrate additional features of one embodiment of the invention, whereby the identity of a user of a recipient or sending device is tested. As described below, such an embodiment of the invention provides a dynamic alternative to conventional static PINs and access codes. The example of FIGS. 4A–4C illustrates the execution of a financial transaction using electronic transmission of information over a communication network. In FIG. 4A, a user 140 has been issued a bank card 142 by a financial institution such as a bank 144. Bank card 142 can be a credit card, a debit card, a smart card, or another instrument for identifying, verifying, and authenticating (IVA) an account of the financial institution and gaining access to the account. While this embodiment of the invention is described in the context of bank cards and financial transactions, the techniques disclosed herein for IVA a party participating in electronic communication can be extended to a wide variety of other situations. By way of example and not limitation, the invention can be used to provide IVA access codes to buildings, to IVA the holder of a telephone calling card or identity card (10), and to IVA the recipient of information of a computer network.

In the example of FIG. 4A, bank card 142 has been issued to user 140 with a copy 116A of a primary key stored thereon. A copy of 116B of primary key is stored at bank 144. Primary key 116 can be generated and replaced as described in reference to FIGS. 1–3. When user 140 desires to execute a transaction using bank card 142, the user swipes the bank card through ATM 146 or another card reading device. Primary key 116A is input to key generation module 118 that generates a passphrase 122A and a secondary key 120A. In this manner, ATM 146, key generation module 118, passphrase 122, and secondary key 120 are analogous to the corresponding elements 10, 18, 22, and 20 of FIG. 1.

ATM 146 transmits secondary key 120A to bank 144 via communication network 114. Bank 144 thereby obtains a copy 120B of the secondary key. As previously disclosed herein, each transaction or transmission of information can be associated with a new secondary key 120 that has been generated by key generation module 118 based on primary key 16.

Bank 144 includes a passphrase reconstruction module 124, which receives the input of secondary key 120B and primary key 116B to reconstruct a copy of 122B of the passphrase. In this manner bank 144, passphrase reconstruction module 124, secondary key 120B, and primary key 116B are analogous to the corresponding elements 12, 24, 20B, and 16B of FIG. 1.

It can be appreciated that, in the context of the electronic transaction being executed in FIG. 4A, the primary concern is typically not the identity of the receiving device (bank 144), but is instead the IVA of the person operating the sending device (ATM 146). Conventional systems often use PINs to attempt to verify that the holder of a bank card or another instrument is authorized to use the instrument to execute transactions. However, PINs, which are static in the sense that they are repeatedly used to transmit a code to a recipient device in multiple transactions, can be breached in a variety of ways as has been disclosed herein. In contrast, user 140 of FIG. 4A is issued an authorization code 148 by bank 144. The authorization code 148, which is described in greater detail in reference to FIG. 4B below, permits user 140 to select and enter an appropriate input code to ATM 146. The input codes are dynamic, in that user 140 will enter different transactions in each of a series of transactions. Authorization code 148 provides instructions to user 140 that enable the user to select the appropriate input code for the particular transaction based on the content of the passphrase.

Turning now to FIG. 4B, the use of the authorization codes and input codes is further described. After the user has swiped the bank card, the ATM or the other card reader provides display 150 to the user. Display 150 prompts the user to enter an input code 152 at the same stage of the transaction as, for example, a PIN would be entered in a conventional electronic transaction.

In this embodiment, authorization code 148 includes an ordered series of character positions of the characters included in the passphrase. In order to further describe the nature of the authorization code and its relation to the passphrase and input code, a specific example is presented in FIG. 4B. In this example, the user has been issued an authorization code 148A that specifies an ordered series of character positions that consist of the sixth character position, the first character position, and the third character position. The user memorizes the authorization code, and a copy of the authorization code is stored at the bank or any other issuing entity as a non-repudiation device. When display 150 prompts the user to enter the input code 152, display 150 presents passphrase 122A to the user. In this example, passphrase 122A consists of the characters L-K-E-B-N-J-H and has been generated by key generation module 118 of FIG. 4A based on the contents of primary key 116A. Furthermore, passphrase 122A has character positions 1–7 illustrated by FIG. 4B. As ATM 146 is repeatedly used to execute successive electronic transactions, different passphrases 122A will be generated.

Returning to FIG. 4B, the user selects the appropriate input code by applying authorization code 148A to passphrase 122A. In particular, in this example, the user identifies the character residing in the sixth character position of passphrase 122A. In this case, the character is J. The user then presses the appropriate one of input keys 154 of input device 156. In this case, the character J is represented by button 4 which enters the digit 4 as the first digit of input code 152. Likewise, the authorization code is used to select the first and third character positions of passphrase 122A. Accordingly, digits 5 and 2 are successively entered using input keys 154 and form the remainder of input code 152.

While the input code in this example is 452, it is highly likely that a different input code will be selected in subsequent transactions, because a new passphrase 122A will be generated for each transaction. In this manner, a static authorization code 148A memorized by the user results in a different input code in successive transactions. This provides significant advantages, since an unauthorized person cannot misappropriate the authorization code by memorizing the key stroke entered by the user, in contrast to the problems associated with static PINs.

Optionally, as shown in FIG. 4B, display 150 does not display the fourth character position of passphrase 122, although all seven characters of the passphrase exist internally in the ATM. Alternatively, any other one or more character positions can be selected to be hidden from view on display 150. However, any such hidden character positions would be ineligible for use in authorization codes distributed to users. Hiding selected character positions from the view of users provides an added layer of security and prevents participants in transactions from learning the entire passphrase.

FIG. 4C further illustrates a method according to this embodiment for using the input code to enable a transaction after the input code has been entered. User 140 has entered input code 152 to ATM 146 as described above in reference to FIG. 4B. Input code 152 of FIG. 4C is transmitted via communication network 114 to bank 144. Bank 144 thereby obtains a copy 152B of the input code. A copy 148B of the authorization code is stored at bank 144. Bank 144 also has a copy 122B of the passphrase, which was obtained after the user swiped the bank card as shown in FIG. 4A. Bank 144 of FIG. 4C is able to calculate the expected input code 152', which must be received from ATM 146 in order to proceed with the desired transaction. Expected input code 152' is generated by applying authorization code 148B to passphrase 122B in much the same manner as input code 152 was generated in FIG. 4B. Typically, however, expected input code 152' of FIG. 4C is generated automatically by computer-executable instructions at bank 144.

After receiving input code 152B, bank 144 can compare received input code 152B with expected input code 152' using an identity verification module 158. If received input code 152B matches expected input code 152', bank 144 presumes that an authorized person has initiated the current transaction. Specifically, received input code 152B matches expected input code 152' only when a person who possesses authorization code 148 enters the input code at ATM 146. When received input code 152B matches expected input code 152', a transaction enablement module 160 permits user 140 to proceed with any desired transaction.

If the received input code 152B does not match expected input code 152', any of a number of conditions can be responsible. For example, the user may have mistakenly entered an incorrect input code. Instead, an unauthorized user may have attempted to gain access to an account. Depending on the nature of the transaction, any appropriate action can be taken when the received input code 152b does not match expected input code 152'. For instance, the card reader can retain the bank card that has been incorrectly used. In some instances, it may be desirable to notify law enforcement authorities to investigate.

The use of the authorization code can be associated with a corresponding emergency code, that when applied to the passphrase to generate an input code, notifies authorities that the bank card or other instrument has been inappropriately used. For example, the authorization code 148A ("613") of FIG. 4B can be associated with an emergency code "316" by reversing the order of the character positions. If the holder of authorization code 148A is ever forced under duress to divulge the authorization code, the holder has the option of divulging instead the emergency code. If an unauthorized person attempts to access the holder's account using the divulged emergency code, authorities are automatically notified that the use of the account is unauthorized.

Figure 5A:
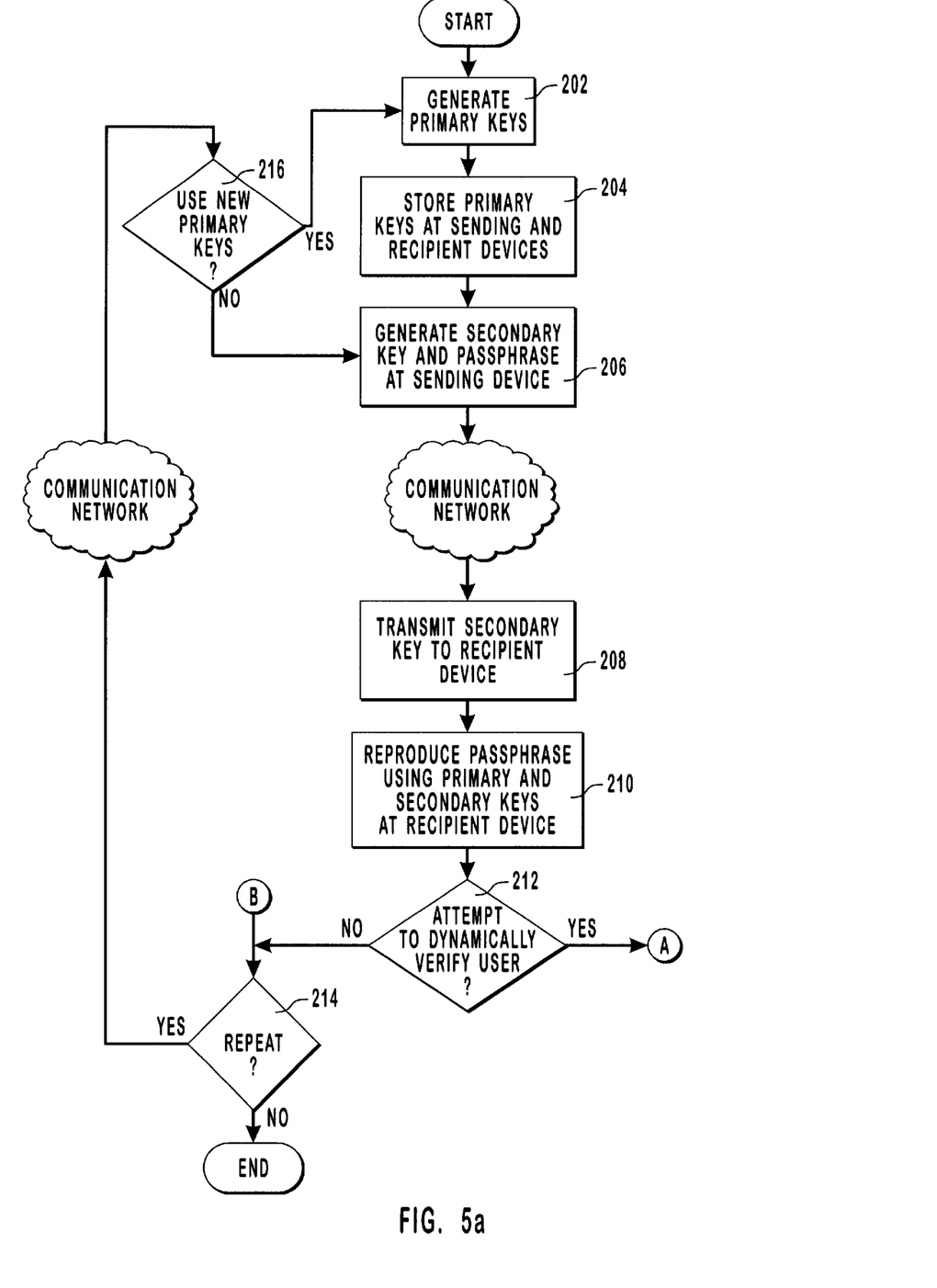
FIGS. 5a and 5b are flow diagrams illustrating methods of the invention for verifying the identity of participants in electronic communication.
Figure 5B:
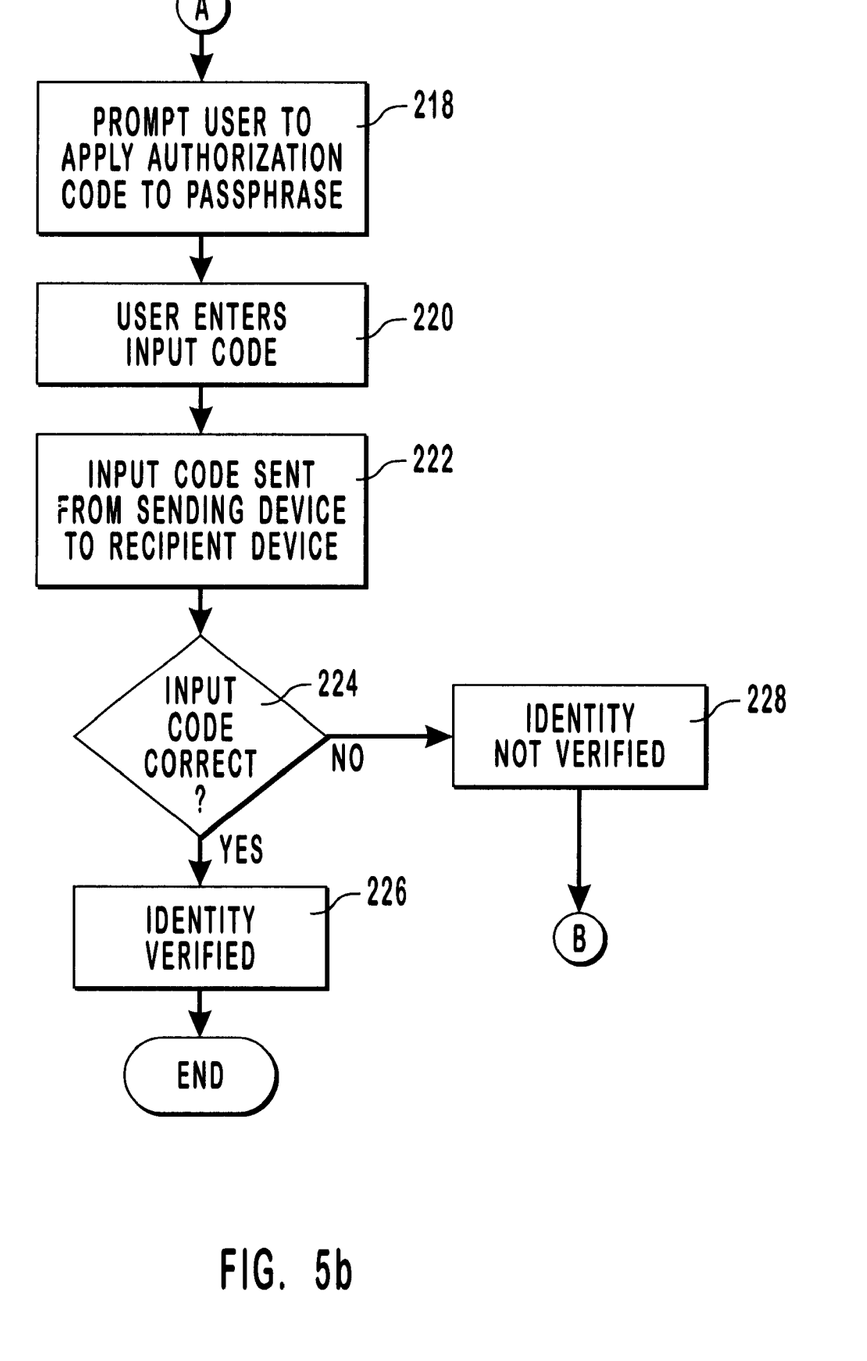

FIGS. 5A and 5B summarize one embodiment of the methods for determining whether a recipient device is authorized to participate in electronic communication and verifying the identity of the user of one of the communication devices. In step 202, a master key is used to generate one or more primary keys. The primary key is stored at the sending device and the recipient device in step 204. When electronic communication is to be conducted, a secondary key is generated by the sending device according to the techniques disclosed herein. The secondary key can be described as including an encrypted form of the passphrase recreation process that is also generated at the sending device.

In step 208, the secondary key is transmitted to the recipient device, along with any desired electronic communication, that may be encrypted, compressed, or otherwise encoded to be inaccessible by any recipient that does not possess or obtain the passphrase. As shown at step 210, the recipient device, which possesses the primary key, reproduces the passphrase using the primary key and the secondary key. The passphrase then may be used in any desired manner or for any desired purpose, such as to gain access to a transmitted or stored document that has been passphrase-protected by the sending device.

As shown at decision block 212, the method can proceed to dynamically identify the user of a communication device using the passphrase and the authorization code. If identification of the user is not desired, the method advances to decision block 214. According to decision block 214, if another electronic communication is to be performed, the method advances to decision block 216. According to decision block 216, if a new primary key is to be created, the method advances again to step 202. New primary keys can be created if there is there is reason to believe that the security of the primary key at the sending device or the recipient device has been compromised. Alternatively, new primary keys can be created at regular intervals. If a new primary key is not needed, the method advances from decision block 216 to step 206. Steps 206 and 208 are then conducted so as to create a new secondary key and a new associated passphrase in each successive transaction or communication.

Referring now to decision block 212, if verification of the identity of a user of a communication device is desired, the method proceeds to step 218 of FIG. 5B. In step 218, the user is prompted to apply an authorization code memorized by the user to the passphrase displayed to the user. In 220, the user enters the resulting input code. The input code is then transmitted to the sending device to the recipient device (or vice versa, if the identity of the recipient device is to be verified) as shown in step 222.

The recipient device then determines according to decision block 224 whether the input code entered by the user matches the expected input code. If the input code is correct, the method proceeds to step 226, in which the identity of the user has been both verified and authenticated. At this stage, any appropriate access to network resources, financial services, or the like, can be granted. If the input code is not correct, the method advances to step 228, in which any appropriate measures can be taken to restrict access to any resources or communication.

While the methods and systems disclosed herein successfully replace conventional passwords and PINs, the invention can be implemented by layering the security features with conventional security features. For example, any encryption technology can be supplemented with the passphrases and other security techniques of the invention to further ensure that only authorized persons gain access to information. Another possible password management system that could be replaced by the invention is a secure fax.

While the combination of the methods for verifying the identity of a communication device using the primary key and the secondary key with the methods for verifying and authenticating the identity of a user of a communication device using the passphrase and the authorization code can be used advantageously in many cases, the invention may be practiced using either of the two foregoing aspects of the invention separately. For instance, the primary key and the secondary key can be used to determine if a computer receiving an e-mail message is authorized without using an authorization code to verify the identity of a user. Conversely, the passphrase and the authorization code can be used to determine whether a participant in an electronic transaction is authorized without verifying that the card reader (i.e., the sending device) and the bank (i.e., the recipient device) are authorized.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for securely transmitting information between a first device and a second device, comprising the steps of:

storing a primary key at the first device and at the second device;

encrypting a selected string of characters to generate a secondary key using the primary key at the first device;

transmitting the secondary key from the first device to the second device;

selecting, by a user of the first device, a subset of the characters in the selected string of characters;

entering, by the user, an input code to the first device, the input code representing the selected subset of characters;

reproducing the selected string of characters at the second device by applying the primary key to the secondary key; and     transmitting the input code from the first device to the second device.

2. A method as defined in claim 1, further comprising the step of transmitting the reproduced selected string of characters from the second device to the first device so as to verify to the first device that the second device possesses the primary key.

3. A method as defined in claim 1, further comprising the steps of:

transmitting, from the first device to the second device, information having been encoded in a form such that the first device can access the information only by applying the selected string of characters to the information; and     at the second device, applying the selected string of characters to the information so as to access the encoded information.

4. A method as defined claim 3, wherein the step of applying the selected string of characters comprises the step of entering a passphrase including the selected string of characters to a password entry field at the second device, the password entry field being associated with software for encoding the information.

5. A method as defined in claim 1, further comprising the step of comparing, at the second device, the transmitted input code to an expected input code, wherein, a match between the transmitted input code and the expected input code indicates to the second device that the user of the first device is authorized to access resources.

6. A method as defined in claim 1, wherein the step of selecting a subset of the characters in the string of characters comprises the step of applying an ordered series of character positions specified in an authentication code possessed by the user to the characters in the string of characters.

7. A method as defined in claim 1, further comprising the step of iteratively conducting the steps of:
storing a new primary key at the first device and at the second device;
encrypting, at the first device, a new string of characters to generate a new secondary key;
transmitting the new secondary key from the first device to the second device; and
reproducing the new string of characters at the second device by applying the new primary key to the new secondary key.

8. A method as defined in claim 1, further comprising the steps of:
storing a second primary key at the first device and at another second device;
encrypting, at the first device, a second string of characters to generate a second secondary key;
transmitting the second secondary key from the first device to the second device; and
reproducing the second string of characters at the second device by applying the second primary key to the second secondary key.

9. A method as defined in claim 1, wherein the step of storing the primary key at the first device and at the second device comprises the steps of:
generating the primary key using a master key; and
distributing the primary key to both the first device and the second device.

10. A method of securely transmitting information over a communication network from a first device to a second device at a remote location with respect to the first device, comprising the steps of:
storing a primary key at the first device and at the second device;
generating a secondary key at the first device using the primary key, the secondary key representing a passphrase in an encrypted form, the passphrase including of a selected string of characters;
transmitting, from the first device to the second device:
information having been encoded in a form such that the first device can access the information only by use of the passphrase in an unencrypted form; and
the secondary key;
applying, at the second device, the primary key to the secondary key so as to reproduce the passphrase in the unencrypted form; and
accessing the encoded information at the second device using the passphrase, wherein the step of accessing the encoded information comprises the step of entering the reproduced passphrase to a password entry field at the second device, the password entry field being associated with software for accessing the encoded information.

11. A method as defined in claim 10, further comprising the step of encrypting the information at the first device, the step of accessing the encoded information comprising the step of decrypting the encoded information.

12. A method as defined in claim 10, further comprising the step of compressing the information at the first device, the step of accessing the encoded information comprising the step of decompressing the encoded information.

13. A method for verifying the identity of a party participating in transmission of information, comprising the steps of:
assigning an authorization code to the party, the authorization code specifying an ordered series of one or more character positions of a passphrase, wherein the passphrase includes a plurality of characters;
displaying the passphrase to the party;
selecting, by the party, characters of the passphrase that reside in the one or more character positions specified by the authorization code;
entering, by the party, an input code representing the selected characters; and
in response to the input code, determining that the identity of the party is recognized and granting the party access to resources.

14. A method as defined in claim 13, wherein the step of selecting characters of the passphrase that reside in the one or more character positions comprises the step of selecting the characters of the passphrase that reside in the one or more character positions according to an order specified by the ordered series.

15. A method as defined in claim 13, wherein the step of displaying the passphrase to the party comprises the step of transmitting the passphrase from a remote first device to the party using a communication network.

16. A method as defined in claim 13, wherein the step of displaying the passphrase is conducted at a first device, the method further comprising the step of transmitting the input code over a communication network to a remote second device, the step of determining that the identity of the party is recognized being conducted at the remote second device.

17. A method as defined in claim 16, wherein the second device is associated with a financial institution and the first device comprises a card reader for providing access to financial services to persons associated with the financial institution.

18. A method as defined in claim 13, wherein the step of granting the party access to resources comprises the step of permitting the party to enter at least a portion of a building.

19. In a communication system including a first device and a second device, the first device and second device capable of communicating one with another over a communication network, a method for verifying the identity of a person engaging in communication over the network, comprising the steps of:
storing a primary key at the second device;
at the first device, encrypting a selected string of characters included in a passphrase to generate a secondary key using a copy of the primary key;
transmitting the secondary key from the first device to the second device;
reproducing the selected string of characters at the second device to generate a secondary key by applying the primary key to the secondary key;

displaying at least a portion of the passphrase to the person;

selecting, by the person, characters of the passphrase that reside at character positions of the passphrase, the character positions being specified by an authorization code assigned to the person, a copy of the authorization code being accessible by the second device;

entering, by the person, an input code to the first device, the input code being derived by the person based on the selected characters;

transmitting the input code from the first device to the second device;

comparing, by the second device, the transmitted input code to an expected input code generated by the second device by applying the copy of the authorization code to the reproduced selected string of characters; and if the transmitted input code is the same as the expected input code, then granting the person access to resources.

20. A method as defined in claim 19, further comprising the step of introducing, by the person, a card to the first device, the card having a copy of the primary key.

21. A method as defined in claim 19, wherein the step of granting the person access to resources comprises the step of enabling the person to authorize a financial transaction over the communication network.

* * * * *